United States Patent [19]

Lee et al.

[11] 4,415,677
[45] Nov. 15, 1983

[54] REMOVAL OF SULFATE IONS FROM BRINE USING COMPOSITE OF POLYMERIC ZIRCONIUM HYDROUS OXIDE IN MACROPOROUS MATRIX

[75] Inventors: John M. Lee; William C. Bauman, both of Lake Jackson, Tex.

[73] Assignee: The Dow Chemical Company, Midland, Mich.

[21] Appl. No.: 307,828

[22] Filed: Oct. 2, 1981

[51] Int. Cl.³ .............................................. B01J 39/18
[52] U.S. Cl. ....................................... 521/28; 423/181
[58] Field of Search .......................................... 521/28

[56] References Cited

U.S. PATENT DOCUMENTS 3,346,422 10/1967 Berger ................................... 521/32
3,352,800 11/1967 Smith et al. ........................... 521/32

*Primary Examiner*—Joseph L. Schofer
*Assistant Examiner*—Peter F. Kulkosky
*Attorney, Agent, or Firm*—W. J. Lee

[57] ABSTRACT

Macroporous cation exchange resins with sulfonic acid functional groups having polymeric zirconium hydrous oxide contained therein are useful in substantially removing $SO_4^=$ ions from metal salt solutions.

11 Claims, No Drawings

REMOVAL OF SULFATE IONS FROM BRINE USING COMPOSITE OF POLYMERIC ZIRCONIUM HYDROUS OXIDE IN MACROPOROUS MATRIX

BACKGROUND OF THE INVENTION

Various alkali metal halide aqueous solutions or alkaline earth metal halide aqueous solutions, e.g., NaCl brine or $MgCl_2$ brine, contain sulfate values or sulfate ions which are considered detrimental if the aqueous solution is intended for use in certain applications, such as in electrolytic processes. There are commercial incentives to substantially removing the sulfate ions.

It is known that hydrous zirconium oxide and other zirconium compounds, such as zirconium phosphates, are useful as inorganic ion exchangers.

SUMMARY OF THE INVENTION

An amorphous polymeric zirconium hydrous oxide is formed within the resin beads of a macroporous cation exchange resin of the sulfonic acid type, thereby forming novel ion exchange composite structures which are useful in removing sulfate ions from metal halide brines.

DETAILED DESCRIPTION

It is known that zirconium hydroxide is prepared by alkali precipitation of an aqueous solution of a zirconyl salt. For the present invention it is preferred that the alkali be ammonia since it is more easily washed out than the alkali metal hydroxides or alkaline earth metal hydroxides. Precipitation at cold (ambient) temperature gives a gelatinous product which is substantially $Zr(OH)_4$ containing about 26.5% water or more. A partially dehydrated zirconyl hydroxide, $Zr(OH)_2$, results from drying it at elevated temperature (e.g., 100° C.), or from hot-precipitation (e.g., 85° C.) followed by hot drying.

Thus, in the present invention the expression "hydrous zirconium oxide" has within the purview of its meaning any of the various amorphous hydrated forms of zirconium oxide which are substantially or largely insoluble in water.

The macroporous cation exchange resin is one which contains sulfonic acid ($SO_3^-$) functional groups. Such resins are available commercially, such as sulfonated polymers of styrene crosslinked with divinylbenzene. For instance a macroporous cation exchange resin with $SO_3^-Na^+$ groups affixed to a styrene-divinylbenzene resin structure is sold by The Dow Chemical Company under the tradename DOWEX MSC-1-$Na^+$. It is within the purview of the present invention to use any porous resin containing sulfonic acid functional groups, so long as the resin is substantially inert or nonreactive, when used in the present invention, except for the reactivity of the sulfonic acid functionality groups.

In general, the polymeric zirconium hydrous oxide is formed within the resin beads by wetting the resin with an aqueous solution of a soluble zirconyl compound, such as $ZrOCl_2.8H_2O$. If excessive zirconyl solution is present, it should be drained off and the resin substantially dried, such as by air-drying. The dried resin, containing the zirconyl compound is neutralized, preferably by use of $NH_4OH$, thereby forming polymeric $ZrO(OH)_2$. Excess $NH_4OH$ and $NH_4Cl$ (which forms) is washed out, such as by repeated contact with NaCl brine. The composite is acidified, such as with HCl.

In the general process outlined above, the beginning zirconyl compound may be $ZrOCl_2.xH_2O$ or the like, such as $Zr(NO_3)_4.5H_2O$, $ZrOBr_2.xH_2O$, $ZrOI_2.8H_2O$, or $Zr(SO_4)_2.4H_2O$, or any such zirconium compound which will precipitate to form $ZrO(OH)_2$ when contacted with a base, especially $NH_4OH$. The so-formed $ZrO(OH)_2$, also called "zirconium hydrous oxide", is an amorphous, polymeric structure. Following the above alkalizing step, the acid used for lowering the pH is preferably HCl, but may also be HBr, HI, $HNO_3$, and the like.

As stated above, once the resin has been acidified, the composite is ready to take on $SO_4^=$ values from brine. This is done, for example, by placing the composite in a vessel, preferably a column, and passing sulfate-containing brine through the composite until the composite is substantially "loaded" with $SO_4^=$ and is ready for another aqueous-washing.

The aqueous-washing of the resin to remove sulfate values therefrom, and to regenerate the resin, may be done with water in some cases, e.g., with NaCl brine, but is preferably done with alkaline water, e.g., with $MgCl_2$ brine. For example, the alkaline wash water may be Mg hydrate, caustic, $NH_4OH$ and the like. Following the alkaline wash, the pH of the resin is lowered using an acid wash.

It is within the purview of this invention that the metal salt brine may be a natural brine, such as seawater or mineral brine, a $MgCl_2$ brine, a LiCl brine, a KCl brine, or a metal salt brine which comes from an ore dressing, ore leaching, mineral dressing, and the like.

The present novel composite exhibits a high affinity for, and a stong preference for, $SO_4^=$ ions.

The following examples are intended to illustrate the present invention, but the invention is not limited to the particular examples shown.

EXAMPLE 1

Here, there is used a macroporous cation exchange resin with $SO_3^-Na^+$ groups affixed to a styrene-divinylbenzene resin structure. Seventy gms of this resin is wetted with a solution of 30 gms $ZrOCl_2.8H_2O$ in 30 gms $H_2O$. The wet resin is air dried to a weight of 95.5 gms. The air-dried resin is neutralized with a solution of 16 ml of 30% aqueous $NH_3$ and 35 ml $H_2O$. The excess $NH_4OH$ and the $NH_4Cl$ are washed out by repeated contact with 26% NaCl solution. The washed resin, suspended in an equal volume of 26% NaCl solution has a pH value (glass electrode) of about 8.2. Addition of 2 ml of 36% HCl lowers the pH to 2.8. The final resin has a settled volume of 139 ml. X-ray diffraction analysis shows no detectable crystallinity.

A vol. of 116 ml of the above resin composite is placed in a column with 73 cm bed depth.

Twenty-six percent NaCl brine containing 970 ppm $SO_4^=$ is pumped downflow at 3.3 ml/min and 50° C. The effluent brine contains less than 10 ppm $SO_4^=$ for more than 1.5 bed volumes of brine. The resin is washed downflow with water at a rate of 21 ml/min. and at 50°–55° C. The effluent is cut into 25 ml portions. The $SO_4^=$ concentration is found to peak in the fourth cut at 14.8 gms./liter. After 1 liter of water passage the total $SO_4^=$ in the effluent is 2.91 gms, which is 70% of the $SO_4^=$ content of the resin in the column. Twenty-six percent NaCl brine is acidified to 1.0 pH, and is then pumped downflow through the column at 21 ml./min. The influent brine contains 970 ppm $SO_4^=$ and the effluent 110–120 ppm $SO_4^=$.

The resin is converted from the Na+ form to the Mg++ form by treatment with an excess of 0.5N MgCl$_2$. The resin is put in the column and treated with a solution of 6 gms of MgAc$_2$.4H$_2$O (magnesium acetate) in 150 ml H$_2$O at a flow rate of 10 ml/min at 50° C. This is followed by 550 ml N/10 HCl at the same rate. The total SO$_4$= removed from the resin is 0.532 gms. Thirty-six percent MgCl$_2$ containing 1.13 gm SO$_4$=/liter, adjusted to 1 pH, is pumped through at 1.7 ml/min and 50° C. Over 1 bed volume of effluent is produced with an average SO$_4$= content of 40 ppm.

Other embodiments will become apparent to persons skilled in the art without departing from the scope of the presently disclosed invention.

We claim:

1. Macroporous cation exchange resin beads having sulfonic acid functional groups and having post-deposited therein polymeric zirconium hydrous oxide.

2. A process for preparing a composite of macroporous cation exchange resins having sulfonic acid functional groups and having polymeric zirconium hydrous oxide contained therein, said process comprising wetting macroporous cation exchange resin beads having sulfonic acid functional groups with an aqueous solution of a zirconyl compound which forms a precipitated zirconium hydrous oxide when alkalized, and alkalizing said zirconyl compound by contacting it with an alkaline material, thereby precipitating zirconium hydrous oxide in said resin.

3. The process of claim 2 wherein the zirconyl compound is at least one selected from the group consisting of ZrOCl$_2$.xH$_2$O, Zr(NO$_3$)$_4$.5H$_2$O, ZrOBr$_2$.xH$_2$O, ZrOI$_2$.8H$_2$O, and Zr(SO$_4$)$_2$.4H$_2$O.

4. The process of claim 2 wherein the alkaline material is ammonia.

5. The process of claim 2 wherein there are performed the additional steps of washing out of ammonium compounds and acidizing the composite.

6. The process of claim 5 wherein the acidizing is performed by using at least one acid of the group consisting of HCl, HBr, HI, and HNO$_3$.

7. The process of claim 6 wherein the acid is HCl.

8. A process for removing SO$_4$= ions from an aqueous metal salt solution, said process comprising contacting said metal salt solution with a macroporous cation exchange resin having sulfonic acid functional groups and having post-deposited therein zirconium hydrous oxide.

9. The process of claim 8 wherein the metal salt is NaCl.

10. The process of claim 8 wherein the metal salt is McCl$_2$.

11. The process of claim 8 wherein the SO$_4$= ions in the resin, following contact of the resin with the metal salt solution, are washed from the resin using an aqueous wash or an alkaline aqueous wash, and, in the case of an alkaline aqueous wash, the acidity of the resin is restored by use of an acid wash.

* * * * *

UNITED STATES PATENT AND TRADEMARK OFFICE
CERTIFICATE OF CORRECTION

PATENT NO. : 4,415,677

DATED : November 15, 1983

INVENTOR(S) : John M. Lee and William C. Bauman

It is certified that error appears in the above—identified patent and that said Letters Patent is hereby corrected as shown below:

Col. 1, line 36, "$Zr(OH)_2$," should read -- $ZrO(OH)_2$, --.

Col. 2, line 17, after "$SO_4=$" insert the word -- values --.

Col. 2, line 33, "stong" should read -- strong --.

Col. 4, line 23, "$McCl_2$." should read -- $MgCl_2$. --.

Signed and Sealed this

Seventeenth Day of April 1984

[SEAL]

Attest:

Attesting Officer

GERALD J. MOSSINGHOFF

Commissioner of Patents and Trademarks